UNITED STATES PATENT OFFICE.

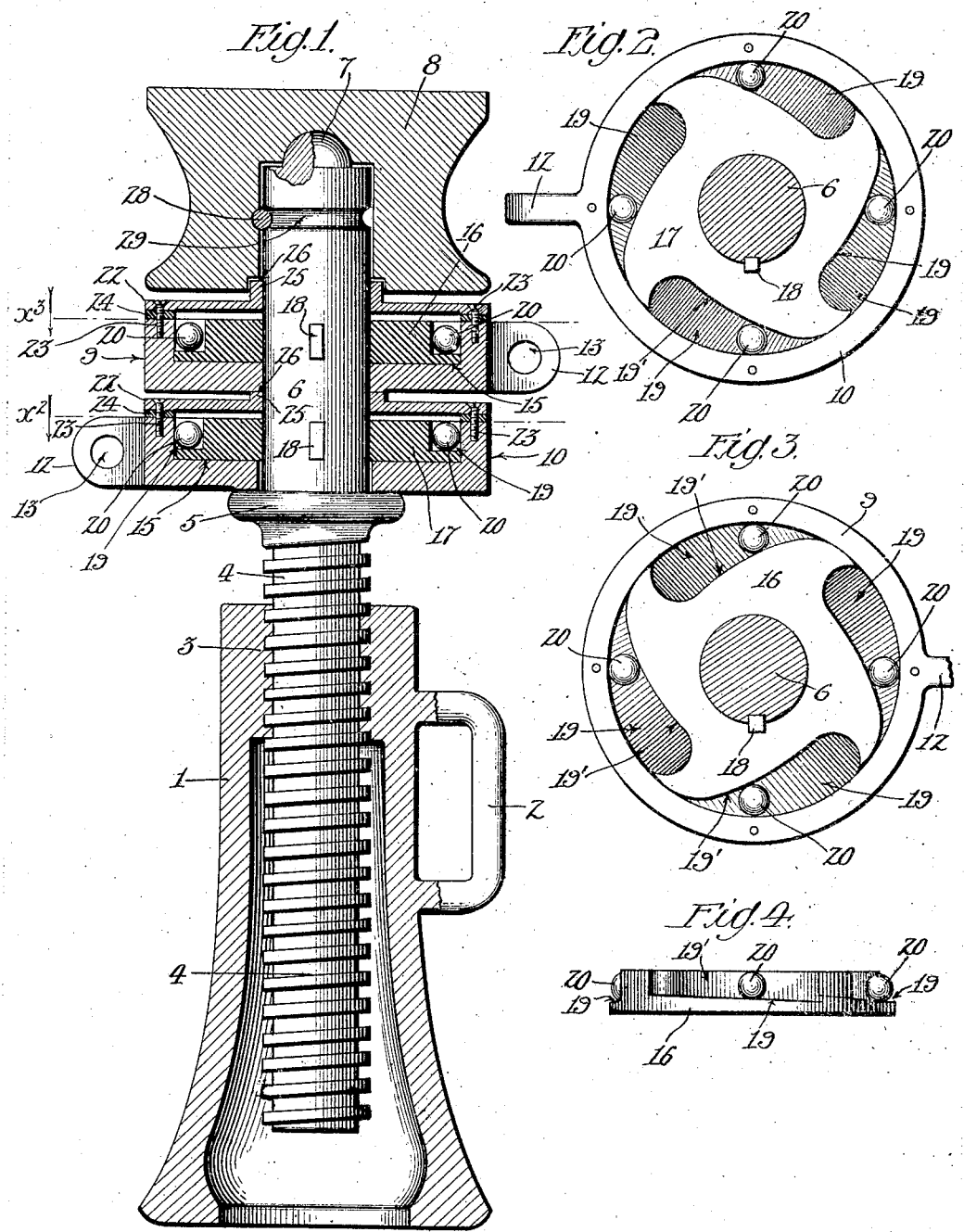

WILLIAM R. LEROY, OF OCEANPARK, CALIFORNIA.

LIFTING-JACK.

No. 845,657.  Specification of Letters Patent.  Patented Feb. 26, 1907.

Application filed December 4, 1906. Serial No. 346,340.

*To all whom it may concern:*

Be it known that I, WILLIAM R. LEROY, a citizen of the United States, residing at Oceanpark, in the county of Los Angeles, State of California, have invented a new and useful Lifting-Jack, of which the following is a specification.

The main object of this invention is to provide a lifting-jack of simple and efficient construction.

A further object of the invention is to provide a lifting-jack wherein the slightest movement of the operating-arm will catch and rotate the jack so that there is substantially no loss of motion, such as is involved in the case of ordinary ratchet movements.

Another object of the invention is to provide a lifting-jack of this character in which the vertical movement can readily be reversed.

In the accompanying drawings, Figure 1 is a vertical section of the jack. Fig. 2 is a plan of the "up" rotating means or friction clutch device on the line $x^2$ in Fig. 1. Fig. 3 is a similar view of the "down" rotating means on the line $x^3$ in Fig. 1. Fig. 4 is a side elevation of one of the rotating members.

1 designates the base or body of the jack, provided with a handle 2 and with a screw-threaded portion 3, in which engages the screw-threaded stem 4 of the jack. Above this screw-threaded portion the jack has a flange or shoulder portion 5 and extends above the shoulder in the form of a vertical arbor 6, provided at its upper end with a bearing, preferably formed as a rounded knob 7, to support the head 8, which is freely rotatable on the jack and serves to take the weight or pressure of the object to be raised without interfering with the rotation of the jack. A key or pin 28 is driven into and fits tightly in a hole in the head 8 and projects laterally into an annular groove 29 in the arbor portion 6 to hold the head from coming off.

Two clutch devices or rotators 9 10 are arranged around the arbor portion 6 of the jack and turn freely thereon. Each of these clutch devices is provided with a projection 12, having an opening 13 for the reception of a suitable operating-handle, (not shown,) and each of said clutch devices is formed as a cylindrical box having a cylindrical recess 15 in its upper face to receive an inner clutch member 16 or 17, which is secured to the shaft or arbor portion 6 of the jack, as by means of a key 18. Each of the inner clutch members 16 17 is provided with a series of pockets or recesses 19 in its peripheral upper portion, said pockets being open outwardly and having their inner walls 19′ extending obliquely outward and forward in a given rotative direction to form a series of curved ratchet-teeth and notches. In the pockets or spaces thus formed between the inner clutch member 16 and the outer clutch members 9 or 10 are placed balls 20. The bottom or floor of each pocket is inclined downwardly and forward in the same rotative direction or from the broad end of each pocket to the tapering or narrow end thereof, so that the ball therein will tend to roll toward the narrow end. The taper of the pockets of the upper clutch device is opposite to that in the lower clutch device, so as to enable operation of the jack in either direction by the use of one or the other of the clutch devices.

The cylindrical recess in the top of each outer clutch member 9 10 is covered by a top plate 22, detachably fastened by screws 23 with a rubber or leather washer 24 to keep out dust. This cover-plate has a flange 25 extending upwardly into a seat 26 on the member above it. In the operation of the device a suitable handle or rod of any kind is placed in the hole 13 of one of the outer clutch members, and by reciprocating the handle back and forth a vibratory movement is imparted to the outer clutch member. In one stroke of such vibratory movement the balls 20 in the pockets 19 roll away from the narrow end of the pockets, so as to turn freely without pinching during such stroke. In the reverse stroke of the handle and the outer clutch member the balls are rolled forwardly toward the narrow end of the pockets, so as to pinch or wedge between the walls of the pockets and the wall of the outer clutch member and carry the inner clutch member and the attached jack around with the handle. When the jack is to be lowered, the handle is placed in the other clutch member, and reciprocation of the handle will then cause lowering of the jack by similar operation to that above described.

What I claim is—

1. A lifting-jack comprising a body, a jack member screwed thereinto, an inner clutch member secured to the jack member and having pockets formed therein, said pockets having their inner walls extended obliquely outward and forward in a given rotative direction and having their floors extending obliquely downward in the same rotative direction, an outer clutch member surrounding the inner clutch member and having a cylindrical inner surface, and balls in said pockets to engage or run free of the inner surface of the outer clutch member and the said oblique walls of the inner clutch member, said outer clutch member being provided with operating means.

2. A lifting-jack comprising a body, a jack member screwed thereinto, two inner clutch members secured to the jack member and having pockets formed therein, said pockets having their inner walls extended obliquely outward and forward in a given rotative direction and having their floors extending obliquely downward in the same rotative direction, an outer clutch member surrounding each inner clutch member and having a cylindrical inner surface, and balls in said pockets to engage or run free of the inner surface of the outer clutch member and the said oblique walls of the inner clutch member, said outer clutch member being provided with operating means.

3. A lifting-jack comprising a body, a jack member screwed thereinto, two inner clutch members secured to the jack member and having pockets formed therein, said pockets having their inner walls extended obliquely outward and forward in a given rotative direction and having their floors extending obliquely downward in the same rotative direction, an outer clutch member surrounding each inner clutch member and having a cylindrical inner surface, and balls in said pockets to engage or run free of the inner surface of the outer clutch member and the said oblique walls of the inner clutch member, said outer clutch member being provided with operating means and with dust-proof caps detachably secured thereto.

In testimony whereof I have hereunto set my hand, at Los Angeles, California, this 26th day of November, 1906.

WILLIAM R. LEROY.

In presence of—
   ARTHUR P. KNIGHT,
   FRANK L. A. GRAHAM.